United States Patent
Toro

(10) Patent No.: US 8,551,666 B2
(45) Date of Patent: Oct. 8, 2013

(54) ELECTRICAL GENERATION SYSTEM COMPRISING MEMBRANE FUEL CELLS FED WITH DRY GASES

(75) Inventor: Antonino Toro, Segrate (IT)

(73) Assignee: Nuvera Fuel Cells Europe S.R.L., S. Donato Milanese (IT)

(*) Notice: Subject to any disclaimer, the term of this patent is extended or adjusted under 35 U.S.C. 154(b) by 903 days.

(21) Appl. No.: 11/665,430

(22) PCT Filed: Nov. 18, 2005

(86) PCT No.: PCT/EP2005/012380
§ 371 (c)(1),
(2), (4) Date: Apr. 13, 2007

(87) PCT Pub. No.: WO2006/053767
PCT Pub. Date: May 26, 2006

(65) Prior Publication Data
US 2007/0287040 A1    Dec. 13, 2007

(30) Foreign Application Priority Data

Nov. 19, 2004    (IT) .................................. MI04A2247

(51) Int. Cl.
*H01M 8/04* (2006.01)
(52) U.S. Cl.
USPC ............................ 429/437; 429/433; 429/434
(58) Field of Classification Search
None
See application file for complete search history.

(56) References Cited

U.S. PATENT DOCUMENTS

| | | | |
|---|---|---|---|
| 4,826,741 A | 5/1989 | Aldhart | |
| 5,773,160 A * | 6/1998 | Wilkinson et al. | 429/434 |
| 6,015,634 A * | 1/2000 | Bonville et al. | 429/415 |
| 6,641,944 B2 * | 11/2003 | Kawasumi et al. | 429/412 |
| 7,396,602 B2 * | 7/2008 | Toro | 429/413 |
| 2002/0071981 A1 | 6/2002 | Sano et al. | |
| 2003/0099873 A1 | 5/2003 | Brambilla | |
| 2004/0137298 A1 | 7/2004 | Sugiura | |

FOREIGN PATENT DOCUMENTS

| | | |
|---|---|---|
| EP | 0 629 015 A1 | 12/1994 |
| JP | 2001-143732 | 5/2001 |
| JP | 2004-171974 | 6/2004 |
| WO | WO 01/41241 A2 | 6/2001 |
| WO | WO 2004/055936 * | 7/2004 |
| WO | WO 2004/088768 A2 | 10/2004 |

OTHER PUBLICATIONS

Japanese Office Action dated Sep. 28, 2011 from corresponding Japanese Patent Application No. 2007-541799, 6 pages.

* cited by examiner

*Primary Examiner* — Cynthia Walls
(74) *Attorney, Agent, or Firm* — Finnegan, Henderson, Farabow, Garrett & Dunner, LLP

(57) ABSTRACT

An electrical generation system, a membrane fuel cell system, suitable for being employed in mobile application, for instance in vehicular applications as a direct electric current generation system comprising at least one polymer membrane fuel cell stack with means for adjusting the temperature of the cells comprising circulating a coolant inside the cells at constant flow-rate, the water and the thermal management of the system being regulated by acting only on the flow-rate of the air feed and on the cell inlet temperature of the coolant.

10 Claims, 5 Drawing Sheets

ELECTRICAL GENERATION SYSTEM COMPRISING MEMBRANE FUEL CELLS FED WITH DRY GASES

This application is a 371 of PCT/EP2005/012380 filed Nov. 18, 2005.

BACKGROUND OF THE INVENTION

The present invention is relative to an electrical generation system, in particular to a membrane fuel cell system, particularly suitable for being employed in mobile application, for instance in vehicular applications.

Among the known types of fuel cell, membrane fuel cells are the most suited to the vehicular applications, because of their particularly simplified internal structure and of their quick start-up allowing them to reach the nominal maximum power in very short times, associated with an excellent response to sudden power peak requirements.

Beside these positive features, membrane fuel cells present however a few inconveniences: among these, particularly relevant is the need of maintaining in a fully hydrated state the proton-exchange membrane, which acts as a solid electrolyte and which commonly consists of a polymeric backbone whereon protonated functional groups, generally sulphonic, are inserted, whose dissociation, determining the proton conductivity, is in fact a function of the water content.

The water content of the membrane is the outcome of a delicate equilibrium between water produced in operation and water extracted by the gases flowing across the fuel cell. The water extraction may become dangerously high when the fuel cell is operated at moderate pressures as required to minimise the energy parasite consumption negatively affecting the global system efficiency. At moderate, and in particular at near-atmospheric operating pressures, the volumetric gas flow-rates are high; on the air side the situation is then particularly critical, since in order to maintain a sufficient oxygen partial pressure even in the cell region close to the outlet, air is supplied in a substantially higher amount, typically double, than the theoretically required value.

In the prior art, the necessary hydration of the membrane is typically preserved by external reactant humidifying systems, nevertheless the associated devices always entail a remarkable system complication and a weight and bulk increase, hardy acceptable especially in the case of mobile applications.

Also the systems for the recovery of product water from the exhausts (especially from the cathodic air) usually entail a condensation step which may be rather onerous, especially because it involves the thermal exchange with water which has to be kept at a very low temperature (indicatively 20° C., for a better efficiency) for being accepted in mobile systems which must be able to operate in any kind of environmental conditions.

A potentially interesting system to simultaneously improve the water and thermal management of fuel cell systems is disclosed in U.S. Pat. No. 6,406,807, wherein the direct injection of water inside the fuel cells is described: the evaporation effectively withdraws the heat generated by the operation simultaneously producing the steam partial pressure required for maintaining a correct membrane hydration. The method nevertheless presents a remarkable difficulty in the adjustment, also in consideration of the fact that, whereas an insufficient water supply would cause a drop in the membrane conductivity, an excessive supply would lead to the flooding of the porous electrodes and to the consequent impossibility of effectively feeding the reactants to the reaction sites, resulting in a downright performance downfall.

In small-size electrical generation systems, especially for vehicular applications, it is desirable however to make use of the sole product water to keep the water balance, also in view of the need of keeping a strict water quality control, since the smallest traces of contaminants, especially foreign cations, could get permanently bonded to the functional groups, thereby reducing the membrane conductivity.

An interesting system in this regard is the one described in WO2004/088768, according to which the fuel cells are fed with dry gases and kept hydrated by the sole product water in a significant range of operation conditions. The system is limited however by the fact that air has to be feed at a temperature below 35° C., possibly comprised between 23 and 27° C.; to get hold of such a cool air in any climatic condition, the system also comprises an ambient air compression, cooling and re-expansion cycle that also involves a certain energy expense; besides that, the system is rather complex in terms of regulations, having to control the temperature of the cathodic exhaust as a function of the air-feed pressure in order to close the balance, and especially having to instantly vary all the different process parameters according to the current density, which may suddenly vary according to the power request, especially in mobile systems.

OBJECTS OF THE INVENTION

The object of the present invention is to provide an electrical current generation system comprising polymer membrane fuel cell stacks overcoming the inconveniences of the prior art.

More particularly, it is an object of the present invention to provide an electrical current generation system comprising polymer membrane fuel cell stacks wherein the heat and water management is regulated by means of an external water supply reduced to a minimum or more preferably without any external water supply, while acting on a minimum possible amount of process parameters at the variation of generated current density.

DESCRIPTION OF THE INVENTION

Under one aspect, the invention consists of an electrical current generation system comprising polymer membrane fuel cells arranged in one or more stacks, whose anodic compartments are fed with a fuel (typically hydrogen) and whose cathodic compartments are fed with air through suitable devices, and in whose interior a coolant is circulated, so that the water and heat balance is maintained at the variation of the current density by acting exclusively on two parameters, that is the air-feed flow-rate and the coolant inlet temperature. In particular, in order to maintain the water balance, it is necessary that the amount of water extracted from the system with the exhausts and the purges be equal to that produced by the reaction; such a water balance is primarily influenced by the current density (whose increase is associated to the increase in the water production, but also to a temperature, and thereby an evaporation increase), and by the volumetric flow-rate, depending on its turn on the molar flow-rate and the pressure. The inventors have surprisingly noticed that, resorting to suitable measures, a membrane fuel cell system can be operated by acting just on the two indicated parameters (air-feed flow-rate and coolant temperature at the cell inlet) in a wide range of current densities and pressures, in such a way that the heat and water balance of the system are self-regulated.

In one preferred embodiment of the present invention, the fuel cells comprise an element with calibrated pressure drop in their interior, allowing to automatically effect the gas-feed pressure regulation as a function of the volumetric pressure of said gas flowing across said element; such element may be present in both compartments, but it is particularly useful in the cathodic compartment, as an air pressure regulator as a function of the air flow-rate. In an even more preferred embodiment, such element with calibrated pressure drop is a reticulated current collector and gas distributor, for instance consisting of materials such as metal foams, sintered materials, meshes, expanded or perforated sheets, optionally overlaid or combined in various fashions. In particular, since the invention is particularly useful for mobile applications, in which the operating pressure is preferably low, it is particularly useful that the geometry of the current collector or other equivalent element be capable of imposing a calibrated pressure drop comprised between 0.01 and 1.5 bar at the flow-rates of practical use (indicatively comprised between 1.2 and 2.5 times the stoichiometric requirement of the cathodic reaction). At the cathodic compartment, air is typically supplied through a compressor or a simple fan, depending on the maximum required operating pressures; the exhaust air exiting the cell after flowing across the element with calibrated pressure drop is typically extracted from the system through an open vent, carrying away a certain amount of water depending on its pressure (and therefore on its flow-rate) and on the cell temperature. Conversely, at the anodic compartment the system of the invention preferably recirculates pure hydrogen, through a recirculation system comprising pumps or ejectors, a small purge of humid hydrogen and a replenishment of dry hydrogen according to the stoichiometric requirement of the reaction. The water extracted at the hydrogen side typically includes also a certain amount coming from the cathode compartment through the membrane, according to a diffusion mechanism which results being self-adjustable in a wide range of conditions. The fuel cell cooling circuit consists of a closed-cycle recirculation of a fluid, for example water, which exchanges heat with the fuel cells according to systems known in the art; the coolant is recirculated at constant flow-rate independently from the generated current density, and is characterised by a cell inlet temperature (before the thermal exchange) and a cell outlet temperature (higher, after extracting heat from the cells). As already said, besides the air flow-rate adjustment as a function of the required current generation, the appropriately configured system is surprisingly capable of maintaining the water and heat balance by acting exclusively on the coolant cell inlet temperature. To achieve this in the most effective manner, it is useful that the air feed be provided cocurrently with respect to the coolant circulation and countercurrently with respect to the hydrogen feed, as will be seen more in detail in the following.

DESCRIPTION OF THE DRAWINGS

The invention will be illustrated hereafter more in detail making use of the following figures, which have a merely exemplifying purpose and do not intend to limit the invention in any way.

Figure 1:
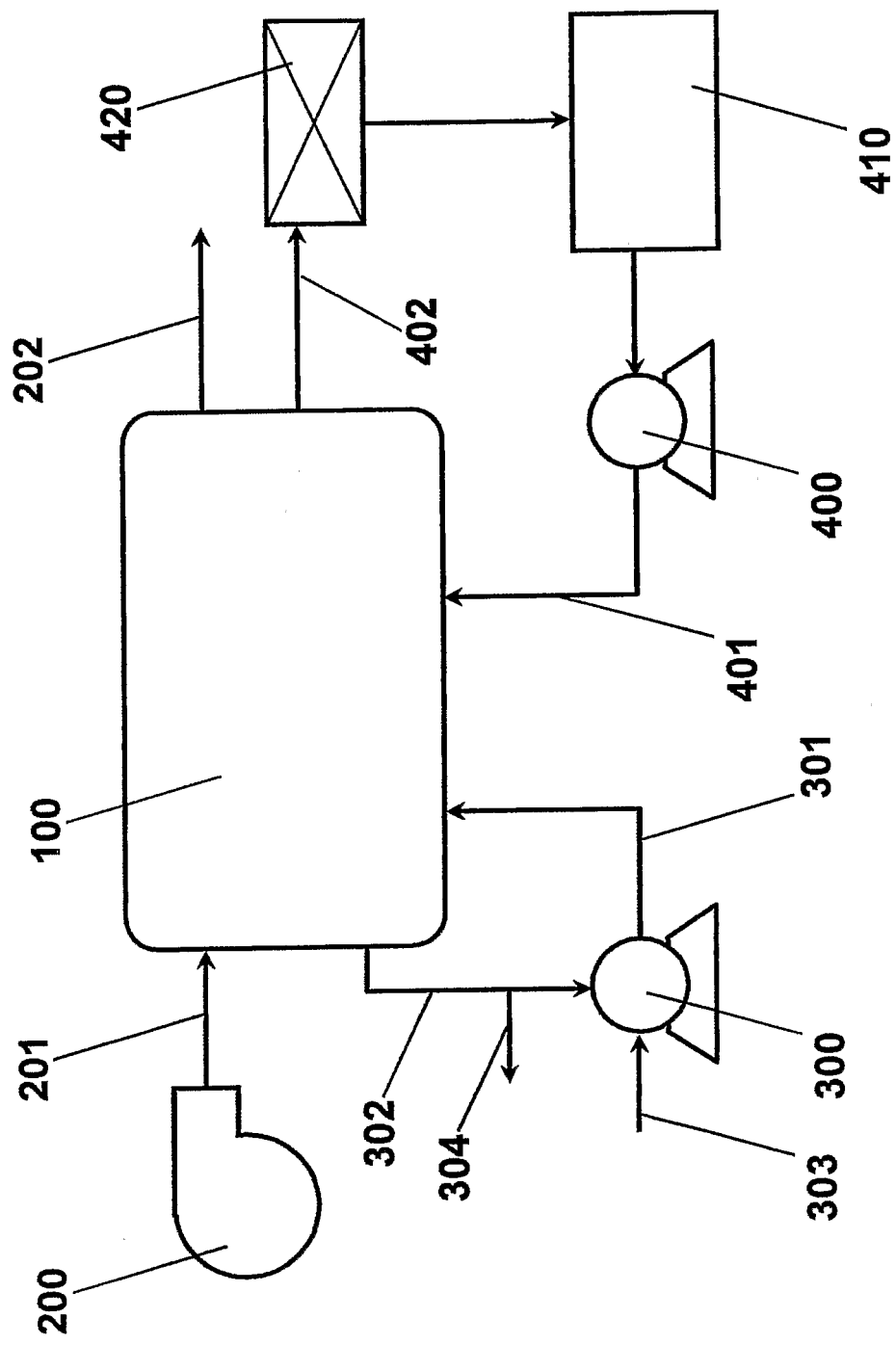
FIG. 1 shows a scheme of one preferred embodiment of the system of the invention.

A polymer fuel cell stack (100) is present at the core of the electrical generation system in FIG. 1; in most of the systems for vehicular or other applications of practical industrial interest, more than one of these stacks is present, but the simplified case of FIG. 1 is suited to describe the invention in its fundamental details. A fan or compressor (200) supplies ambient air, preferably filtered and purified, to the cathodic compartment of the various cells. The inlet flow (201) has a flow-rate adjusted as a function of the power requirement of stack (100), that is of the current that the latter is demanded to generate; a component with calibrated pressure drop, not shown, present inside the cells making up the stack (100), usually a reticulated current collector, automatically adjusts the operating pressure (typically between 0.01 and 1.5 bar absolute) as a function of the air flow-rate. The exhaust air (202) is removed through an open vent to the external environment.

At the cell anodic compartment, the pump (300) recirculates hydrogen, whose suction (301) is in countercurrent with respect to the one of air. From the moisture-enriched exhaust hydrogen, a small purge (304) is extracted, while a dry hydrogen replenishment (303) restores the amount consumed by the reaction. Although the figure shows a single pump (300) functioning as hydrogen recirculator, in more complex systems such role may be actually played by a an arrangement of pumps or ejectors.

The pump (400) or other equivalent element is provided for feeding, preferably in cocurrent with respect to the air and in countercurrent with respect to the hydrogen, the coolant, which in many cases may simply consist of water; the cell inlet (401) water temperature is adjusted as a function of the current density, while the flow-rate thereof is constant. To adjust the water temperature, the cell outlet (402) flow is delivered in this case to a heat exchanger (420) before being supplied to a tank (410), even though different solutions are possible.

According to the functioning principle of the invention, the water balance control across the membrane is achieved by withdrawing the product water partly through the cathodic exhaust (202) and partly through the anodic purge (304), while the thermal balance is simultaneously maintained by withdrawing the product heat through the circulation of the coolant at constant flow-rate.

On the cathode side, at low current rates, the product water amount is minimum, but the heat generated by the cells which contributes to its evaporation is also minimum. For practical reasons, the compressor or fan (200), although regulated at a minimum, delivers air in a remarkable excess with respect to the stoichiometric request; such quantity of air, which occupies a relatively high volume due to the lower pressure imposed at the low operating regimes by the element with calibrated pressure drop, is in any case sufficient to withdraw the product water.

On the contrary, at high current density the high amount of product water and the higher compression induced by the correspondingly higher amount of air flowing across the element with calibrated pressure drop are compensated by the higher heat generation, and hence by the higher water evaporation.

On the anode side, it is necessary to feed a small amount of water only if the fuel is not recycled. In the preferred embodiment shown in the figure, the fuel supplied is pure hydrogen, whose fraction consumed by the reaction is restored in the dry state (303) with no water addition.

If the hydrogen and air flows are kept in countercurrent, for instance by feeding air from the top and hydrogen from the bottom, it is easier to maintain the water balance across the membrane, since both flows accumulate humidity while they proceed toward the relevant outlet. Maintaining the flows in countercurrent thereby allows having the drier air flow at the cell inlet in the membrane zone opposite the outlet of humid hydrogen before the purging, and the feed of relatively less humid hydrogen, downstream the replenishment, in the membrane zone opposite the outlet of air which has gradually accumulated humidity.

Feeding the hydrogen countercurrently to the coolant one is conversely advantageous because it permits keeping its humidification rate under control, preventing that a significant fraction of the water be condensed before the cell inlet. In other words, it is advisable to maintain the dew point of the hydrogen flow at the cell inlet (301) below the coolant temperature at that point; since the coolant temperature is higher at the cell outlet than at the inlet, the countercurrent flows give a higher operating margin.

The following figures demonstrate the excellent functioning of the system of the invention, which is surprisingly capable of operating without any independent regulation of gas humidification, coolant flow-rate or cell internal pressure, just by adjusting the air flow-rate and the temperature of the coolant at the cell inlet.

EXAMPLE

Figure 2:
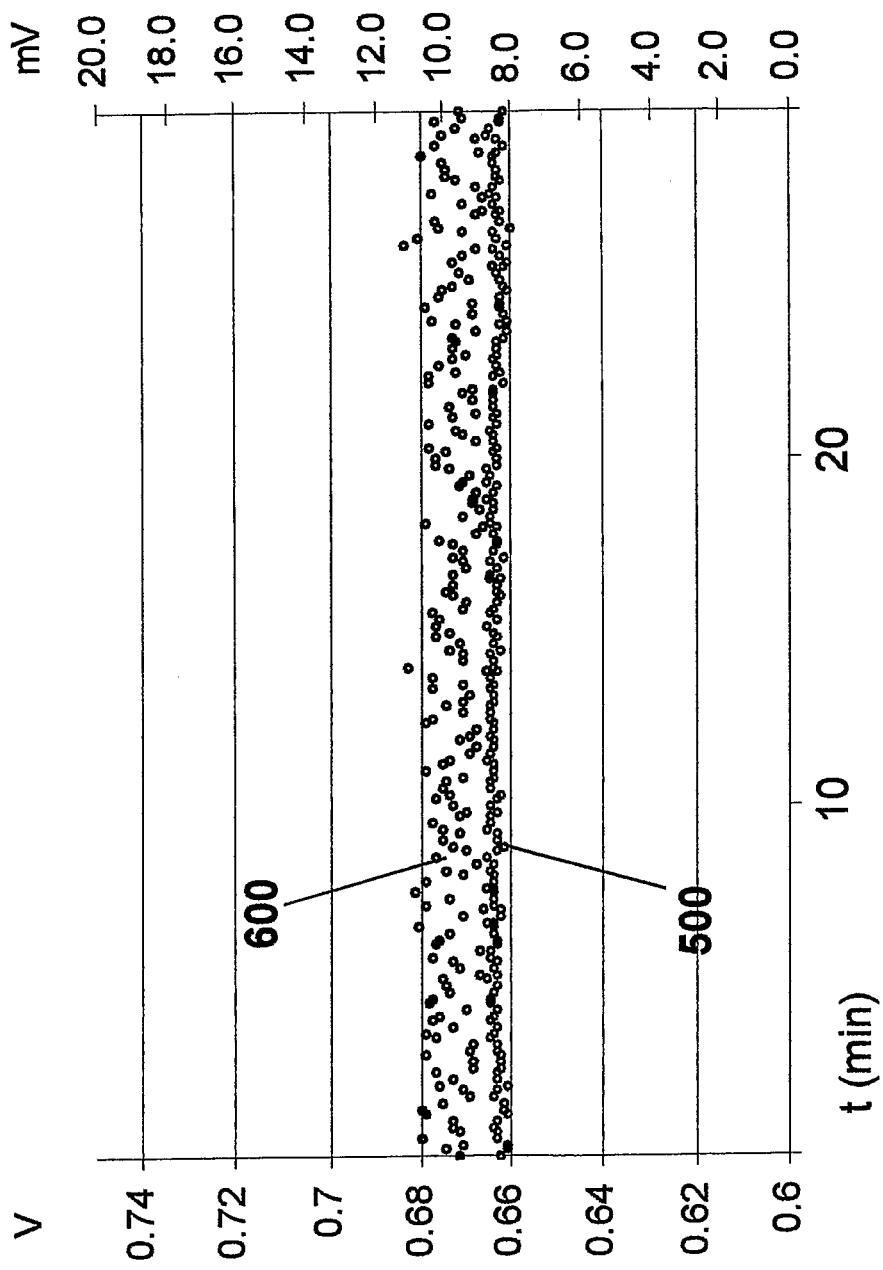
FIGS. 2-5 show the trend in time of the voltage generated by a fuel cell stack of the generating system of the invention and of the standard deviation of the voltage of the single cells.
Figure 3:
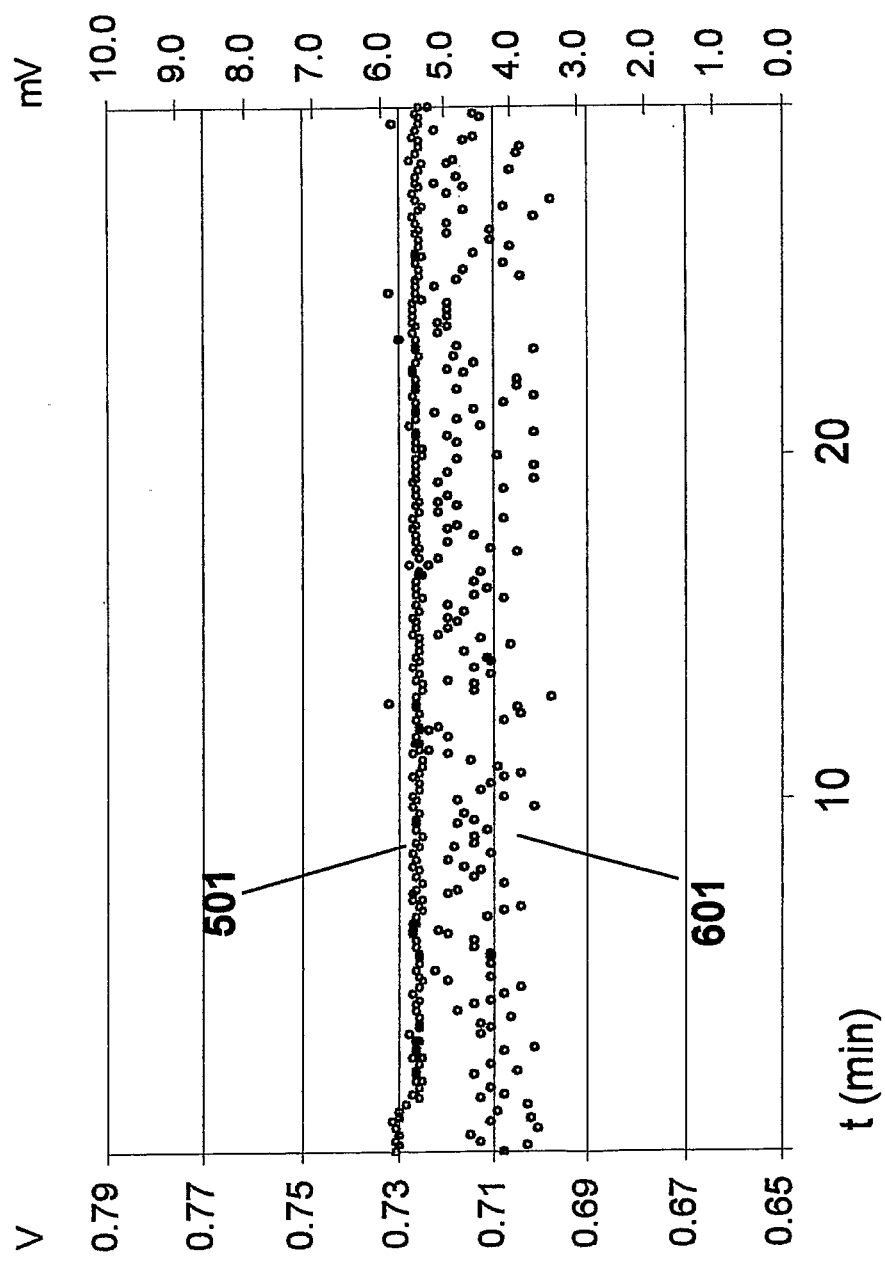

A test campaign was carried out on a stack of 14 polymer membrane fuel cells, having a 360 cm² active area and provided with ion exchange membrane/gas diffusion electrode assembly PRIMEA® series S7 produced by Gore/Japan, and with current collectors consisting of a nickel foam with controlled porosity (100 pores per linear inch, p.p.i.) in a system equivalent to that of FIG. 1. As the coolant, demineralised water was used, whose flow-rate was kept constant at 0.4 l/min per cell during the whole test campaign. Such flow-rate corresponds to about 11 l/min per square meter of active area; typically, an optimum functioning is obtained in the whole range of practical current densities at least for values comprised between 10 and 50 l/min per square meter of active area, and it is preferred to maintain the flow-rate near the lower limit of this range to decrease the associated energy consumption. The anode was fed with pure hydrogen recirculated at constant flow-rate, with a small discontinuous purging and a dry hydrogen replenishment corresponding to the stoichiometric requirement of the reaction. The stack was first operated at a current density of 8 kA/m², adjusting the water inlet temperature at 58° C., and keeping an air flow-rate of 1.7 times the stoichiometric flow-rate. The test was protracted for 30 minutes, obtaining the results summarised in FIG. 2: there are reported the operation time on the axis of abscissas, the average cell voltage (dotted curve 500) on the axis of ordinates at the left hand side, the cell voltage standard deviation (point dispersion curve 600) on the axis of ordinates at the right hand side; it can be noticed that the voltage value is very stable in time, and that the individual cells have values rather close with each other. The situation does not appear to be changed in the subsequent 30 minutes of test, carried out at a much reduced current density, equal to 4 kA/m², whose results are reported in FIG. 3. Compared to the situation of FIG. 2, the inlet water temperature was decreased to 53° C., and the air-flow was changed (decreasing its absolute value, while increasing its excess up to a value of twice the stoichiometric requirement). The internal pressure in the cell cathodic compartment was thus decreased from 1.5 to 1.26 bar absolute. In this specific case (air pressure not too much reduced, in any case higher than 1.2 bar absolute) it wasn't even necessary to act on the cell inlet water temperature. As it can be noticed in FIG. 3, the cell voltage (501) remains very stable in time (although obviously higher than in the previous case, since the current density was reduced). Also the standard deviation (601) results consequently lower. By acting on the air flow-rate and on the cell inlet water temperature, it is possible to observe similar trends in a wide range of current densities (at least from 0.1 to 12 kA/m²) and operating pressures (stoichiometric excess in the air flow-rate so as to maintain an internal pressure on the cathode side comprised between 0.05 and 1.5 bar). The operation stability in the specified conditions was confirmed in a series of tests at various current densities, varying the generation conditions both over long and short cycles, during an overall 16 hours of operation.

Figure 4:
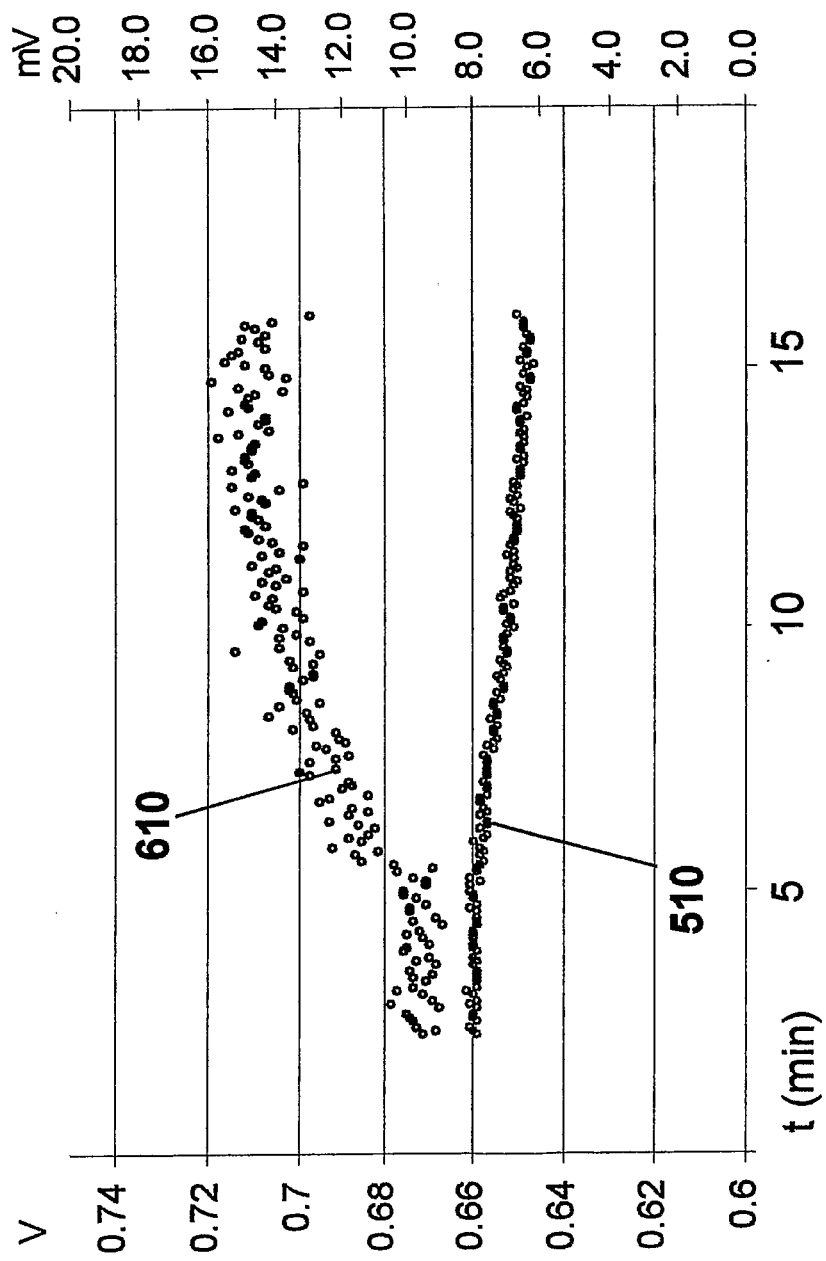
Figure 5:
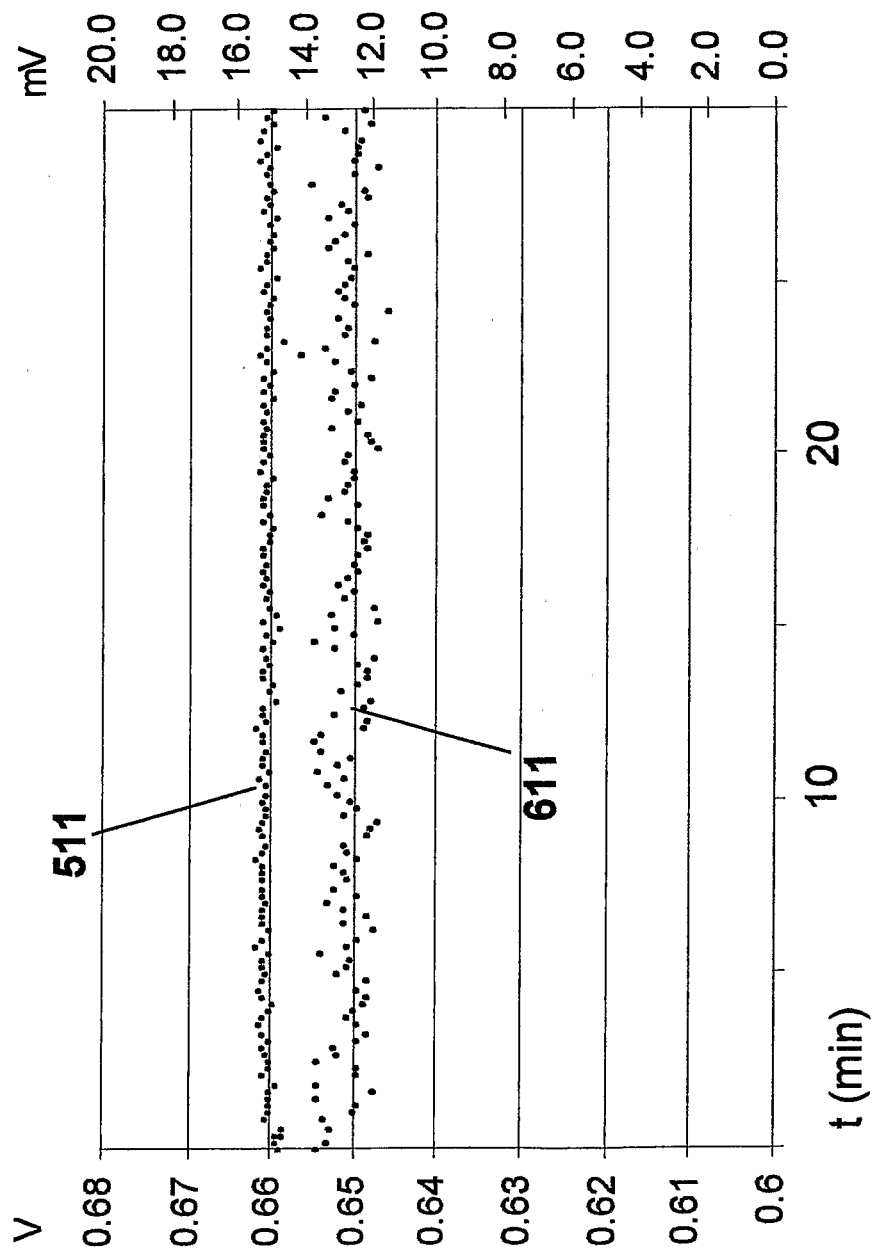

The criticality of the two process parameters (air flow-rate and inlet coolant temperature) is shown in the subsequent figures; FIG. 4 shows in particular the progress of the stack at 0.8 kA/m², in the same conditions as in FIG. 2, but with an excessive water inlet temperature (64° C.). It can be noticed how in the course of a few minutes the average cell voltage (510) tends to decrease sharply, while the standard deviation (610) has a peak, indicating how in some cells, drying out and membrane conductivity loss conditions are established more quickly than in others. In the case of FIG. 5, the water inlet temperature was brought back to the correct value of 58° C., but the air flow-rate was increased up to a stoichiometric excess of 2.1, with respect to the optimum value of 1.7 calculated for that temperature at that current density. The effect on the cell voltage (511) does not show a sharp worsening with respect to the ideal situation of FIG. 2, but the trend is in any case of an increase in time and the standard deviation (611) is a little bit higher, indicating that the system is in an unbalanced situation which may not be protracted for longer periods of operation.

As it is evident to one skilled in the art, the invention may be practised making other variations or modifications to the reported examples.

The previous description is not intended to limit the invention, which may be used according to different embodiments without departing from the scopes thereof, and whose extent is univocally defined by the appended claims.

Throughout the description and claims of the present application, the term "comprise" and variations thereof such as "comprising" and "comprises" are not intended to exclude the presence of other elements or additives.

The invention claimed is:

1. A direct electric current generation system comprising at least one polymer membrane fuel cell stack, means for feeding a fuel in parallel to the anodic compartments of said cells, means for feeding air in parallel to the cathodic compartments of said cells wherein one or more cathodic compartments comprises a component capable of imposing a calibrated drop in pressure of air fed to the compartment, wherein the water and thermal management of the system is capable of being regulated at the variation of the current density of the at least one fuel cell stack by varying only the flow-rate of said air feed and the cell inlet temperature of a coolant circulated inside said cells at a constant flow-rate.

2. The system of claim 1 wherein said component is capable of imposing a calibrated drop in pressure is a reticulated current collector.

3. The system of claim 2 wherein said reticulated current collector comprises at least one member selected from the group consisting of metal foam, metal mesh, expanded or perforated sheet, and sintered material.

4. The system of claim 1 wherein said component is capable of imposing a calibrated drop in pressure comprised between 1.2 and 2.5 times the stoichiometric flow-rate of air fed to the compartment.

5. The system of claim 1 wherein said feeding of a fuel in parallel to the anodic compartments of said cells and said coolant circulation inside said cells are oriented in countercurrent.

6. The system of claim 5 wherein said feeding of air to the cathodic compartments of said cells is oriented in concurrent with respect to said coolant circulation and in countercurrent with respect to said feeding of a fuel to the anodic compartments.

7. The system of claim 1 wherein said means for feeding a fuel in parallel to the anodic compartments of said cells consist of a hydrogen recirculator comprising at least one pump or ejector, a humid hydrogen purge and a pure dry hydrogen replenishment.

8. The system of claim 1 wherein said coolant is circulated at a constant flow-rate between 10 and 50 l/min per square meter of active area.

9. The system of claim 1 wherein said means for feeding air in parallel to the cathodic compartments of said cells comprise at least one compressor or one fan.

10. The system of claim 1 wherein the water balance is capable of being maintained so as to withdraw the sole water produced by the combination of said fuel and said air inside said fuel cell stack through the anodic purge and the cathodic exhaust, without any additional external supply of water.

* * * * *